April 16, 1963 D. O. LEIBY 3,085,499
APPARATUS FOR MAKING DOUGHNUTS
Filed July 6, 1959
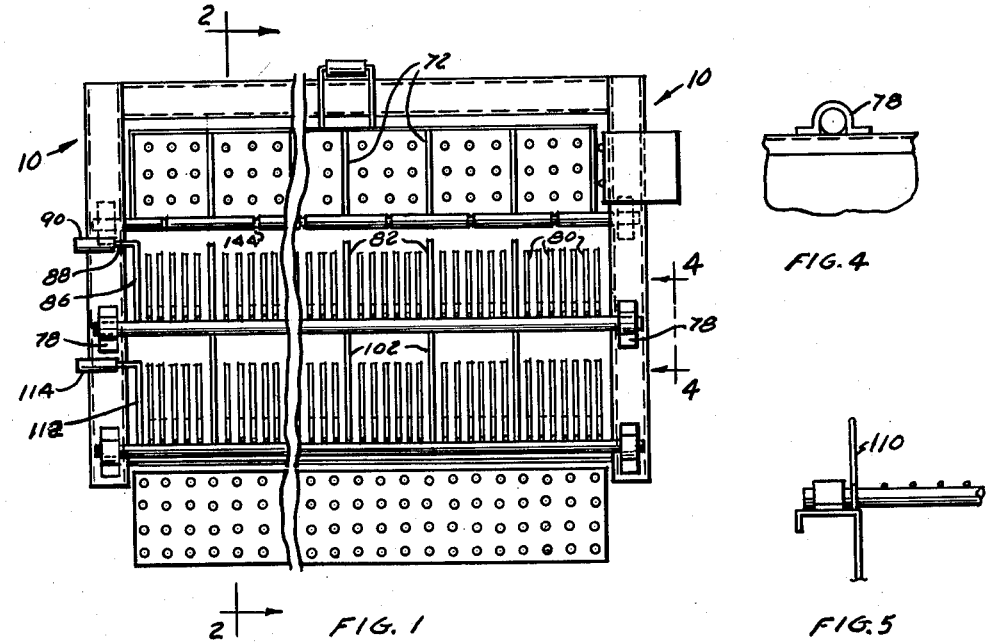
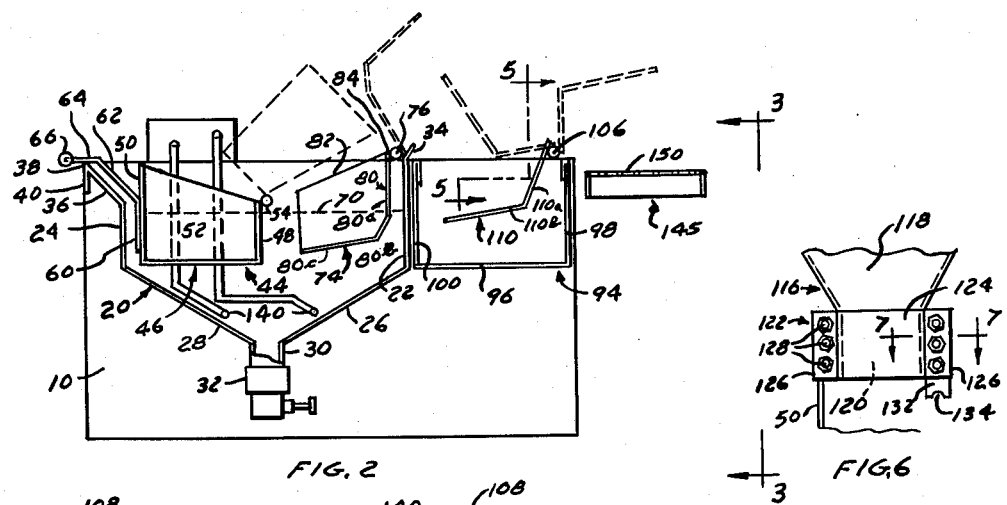
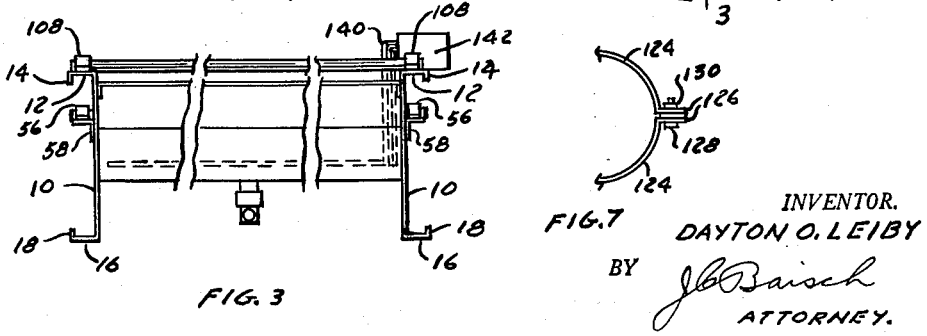
INVENTOR.
DAYTON O. LEIBY
BY
ATTORNEY.

United States Patent Office 3,085,499
Patented Apr. 16, 1963

3,085,499
APPARATUS FOR MAKING DOUGHNUTS
Dayton O. Leiby, South San Gabriel, Calif., assignor to DCA Food Industries Inc., New York, N.Y., a corporation of New York
Filed July 6, 1959, Ser. No. 825,283
1 Claim. (Cl. 99—355)

This invention relates generally to cooking apparatus and relates more particularly to apparatus for making doughnuts.

While the invention has particular utility in the frying of doughnuts and the like, and is shown and described in connection therewith, it is to be understood that its utility is not confined thereto.

It is an object of the invention to provide improved apparatus for frying and icing doughnuts.

It is another object of the invention to provide a cooking apparatus wherein the doughnuts are thoroughly gassed out during frying thereof.

It is still another object of the invention to provide apparatus of this character wherein the danger of breaking the doughnuts is eliminated.

It is still another object of the invention to provide apparatus of this character wherein the doughnuts are properly cooked with a minimum of grease getting into them.

It is a further object of the invention to provide apparatus of this character with which there is uniform cooking of the doughnuts. This is possible because all of the doughnuts of a batch are turned at the same time.

It is another object of the invention to provide apparatus of this character with which the doughnuts are cooked with only one turning.

Still another object of the invention is to provide apparatus of this character with which the doughnuts are easily and quickly iced.

A further object of the invention is to provide apparatus of this character wherein excess icing may be drained.

A still further object of the invention is to provide apparatus of this character with which respective doughnuts of a batch may be simultaneously iced with icing of different colors.

Another object of the invention is to provide apparatus of this character in which but a small amount of shortening or grease is used at a time so that such grease will be used up in a relatively short time and replaced with fresh grease.

Still another object of the invention is to provide apparatus of this character which is easy to clean and with which little grease is lost when the apparatus is cleaned.

A further object of the invention is to provide apparatus whereby cooking and icing of the doughnuts is substantially speeded up, thereby greatly reducing the cost of making them.

A still further object of the invention is to provide apparatus with which the doughnuts may be made as needed so that they will be at all times fresh for the customers.

Another object of the invention is to provide apparatus which does not require an expert cook to use and carry out.

Still another object of the invention is to provide apparatus of this character that is relatively simple in construction and operation.

A further object of the invention is to provide apparatus of this character that is relatively inexpensive to manufacture.

The characteristics and advantages of the invention, are further sufficiently referred to in connection with the following detailed description of the accompanying drawings which represent one embodiment. After considering this example, skilled persons will understand that many variations may be made without departing from the principles disclosed, and I contemplate the employment of any structures, arrangements or modes of operation that are properly within the scope of the appended claim.

Referring to the drawings, which are for illustrative purposes only;

FIG. 1 is a plan view of apparatus embodying the present invention;

FIG. 2 is a sectional view, taken on line 2—2 of FIG. 1;

FIG. 3 is a front elevation of said apparatus as seen from line 3—3 of FIG. 2;

FIG. 4 is a fragmentary view taken on line 4—4 of FIG. 1;

FIG. 5 is a view, partly in section, taken on line 5—5 of FIG. 2;

FIG. 6 is a fragmentary side view of the lower end of a dropper device with the indexing or locating means of the invention embodied therein; and FIG. 7 is a sectional view taken on line 7—7 of FIG. 6.

Referring more particularly to the drawings, the device comprises end support members 10 of suitable material. While these members may be variously constructed, they may be formed of sheets of stainless steel. Each of the end members has an outwardly turned horizontal top part 12 from the free edge of which there is a depending flange 14. Along the bottom edge there is a horizontal base portion 16 from the free edge of which there is an upturned flange 18.

The cooking receptacle, indicated generally at 20 is disposed between the end members 10. It is formed of stainless steel sheet material, although other suitable material may be used. There are front and rear vertical sides 22 and 24 respectively which extend longitudinally of the apparatus and there is a bottom in the general shape of a V with the lower part running along the longitudinal center of the receptacle. The bottom is formed of oppositely aranged bottom members 26 and 28 which incline downwardly and inwardly from the lower edges of the sides 22 and 24 respectively. At a convenient location along the bottom of the V is a drain pipe 30 having a suitable valve 32 which may be opened so that liquid may be drained from the container when it is desired to clean or service the apparatus.

Along the upper edge of the vertical side member 22 there is an outwardly and upwardly inclined flange 34 which extends above the plane of the horizontal top parts 12 which plane also may be considered the top plane of the receptacle.

The vertical side 24 does not extend upwardly to the top plane of the receptacle but has an outwardly and upwardly inclined part 36, the top edge 38 of which terminates at said plane and from which depends a short vertical flange 40. The ends of the receptacle parts 22, 24, 26, 28, 36, 38 and 40 are brazed, soldered, or otherwise suitably secured to the support members 10, parts of which then define the ends of the cooking receptacle.

Within the cooking receptacle 20 and along the back side is a cooking tray, indicated generally at 44, having a perforated bottom 46, front and rear walls 48 and 50 respectively, and ends 52. The front wall of the tray 44 is lower than the rear wall and has a shaft 54 secured along its upper edge by welding or the like, the ends of said shaft extending outwardly of the support members through openings provided therefor and into bearings 56 secured to the outer sides of the support members by brackets 58. The bearings may be welded or otherwise secured to the respective brackets and the latter may be similarly secured to the respective support members.

A handle 60 is attached to the rear wall 50 of the tray by welding or other suitable means, and said handle includes an upwardly and outwardly extending part 62, the outer end of which there is a horizontal part 64 which extends outwardly or rearwardly of the edge 38 and normally rests thereon, there being a hand engageable element 66 carried at the free end of the part 64 of low heat transferring material.

Normally the tray 44 is in the upright cooking position shown in solid lines in FIGS. 1 and 2 with the lower part beneath the surface, indicated by the dotted line 70 in FIG. 2, of the shortening or grease in the receptacle 20 which is below the shaft 54. The interior of the tray 44 is divided into a series of longitudinally arranged compartments by partitions 72, said compartments being of sufficient size for any doughnuts cooked in the apparatus and keep said doughnuts from migrating or floating from their proper position.

It is to be noted that the tray 44 occupies approximately the rear half of the receptacle. The other half of the receptacle is occupied normally by a rack, indicated generally at 74, comprising a shaft 76 which extends longitudinally of the receptacle 20 along the upper edge of the front side thereof, as best shown in FIGS. 1 and 2. The ends of the shaft 76 are rotatably mounted in bearing brackets 78 which are secured to the respective parts 12 of the end members 10. The rack has a plurality of wire fingers 80 which have their upper ends welded or otherwise suitably secured to the shaft 76 and spaced apart longitudinally relative to said shaft. The fingers 80 are all alike and have normally depending parts 80a, an inwardly and downwardly inclined part 80b and an inwardly extending part 80c which is inclined downwardly somewhat toward the free ends thereof. The rack also has a plurality of partitions 82 secured at 84 to the shaft 76 by welding or the like, said partitions being spaced apart longitudinally on the shaft 76 and are arranged to correspond with the partitions 72 of the tray 44 to provide spaces for doughnuts and keep same from floating out of position.

An actuating handle is provided for the rack and comprises an arm 86 normal to the shaft 76 with an outwardly turned end portion 88 having a hand engaging element 90 thereon, said portion 88 normally resting on the adjacent part 12 of the adjacent end member and when in said position the parts of the rack are disposed as shown in solid lines in FIGS. 1 and 2.

At the front of the receptacle there is icing means comprising an icing container, indicated generally at 94, which extends longitudinally of the apparatus and has a bottom 96, and front and rear walls 98 and 100. These parts are formed of a single sheet of stainless steel or other suitable material or otherwise formed, and the ends are welded or otherwise suitably secured to the respective end members 10 to provide a leak proof container for icing. Within the container are a series of partitions 102 corresponding to and aligned with the partitions 72 and 82. The partitions form fluid tight compartments for icing and the icing in each compartment may be of a different color and/or flavor. While the compartments shown herein are of substantially the same size as the spaces defined by the partitions 72 and 82 of the tray 44 and rack 74 it is to be understood that fewer partitions 102 may be used to lengthen the compartments to accommodate several doughnuts at a time.

The icing means also includes a rack comprising a rotatable shaft 106 having end portions operably mounted in bearing brackets 108 similar to the brackets 78 and likewise welded or otherwise suitably secured to the parts 12 of the end members 10. There are a plurality of wire fingers 110 spaced apart longitudinally on the shaft 106 and welded or otherwise secured thereto.

Shaft 106 is at the top of the icing container and extends adjacent the upper edge of the front wall 98 but inwardly of the plane thereof. From shaft 106 normally vertical parts 110a of the fingers depend and from the lower ends of said parts substantially horizontal parts 110b extend rearwardly. There are a plurality of fingers in each compartment of the icing container to properly support doughnuts when raising same from the container.

An actuating handle is provided for the shaft 106 and comprises an arm 112 which extends rearwardly from said shaft and has an end part that is turned laterally outwardly over the part 12 of the adjacent end member 10, said handle part having a hand engageable part 114 thereon normally resting on said part 12 of the adjacent member 10 so that the icing rack is normally positioned as shown in solid lines in FIGS. 1 and 2.

The icing rack is so arranged that when in a raised position whereat the fingers clear the adjacent end member 10, the fingers at one end are spaced sufficiently from the adjacent bearing 108 to permit the shaft to be shifted longitudinally toward said bearing to position at least one of the adjacent fingers over the part 12 of the adjacent end member 10 and said finger or fingers are adapted to have the end or ends thereof remote from the shaft rest on said part 12 with the parts 110b of the fingers inclined rearwardly somewhat, as indicated in dotted lines in FIG. 2, so that doughnuts carried by the icing rack will remain thereon while excess icing on said doughnuts drains back into the respective compartments of the icing container.

A doughnut dropper 116 is provided which is of the usual well known character and includes a funnel shaped part 118 at the bottom terminating in a cylindrical part 120.

To the dropper is attached an adapter, indicated generally at 122, which comprises two oppositely arranged, complementary bands 124 having outwardly extending flanges 126 with aligned openings therein, said bands being clamped about the cylindrical part 120 of the dropper by means of threaded bolts and nuts 128 and 130 respectively, the bolt shanks being received in said aligned openings in the flanges 126. Between the flanges 126 at one side is a plate 132 which depends below the plane of the bottom of the cylindrical part and clamping bands, as best shown in FIG. 6, and which has an arcuate notch 134 in the lower end thereof.

One or more electrical heating elements 140 of well known character may be used to heat the grease or shortening in the receptacle 20. As shown, the heating element is disposed at the bottom and within the receptacle. It is generally V-shaped with the apex at the left hand end of the receptacle, as shown in FIGS. 1 and 3, and the free ends of the V connected to a suitable source of electrical current supplied to a control box 142, said source of current not being shown. The mechanism in the control box is of well known character for varying the heat produced by the heating element so as to regulate the heating of the shortening or grease and maintain same at the desired temperature. Other heating means such as gas may be used instead of the electrical means.

When the grease is at the proper temperature the dropper is used to drop dough into the spaces provided therefor in the cooking tray 44. In this step the notch 134 of the plate 132 is placed to receive the shaft 54 and is moved into a respective groove 144 in shaft 54 provided therefore for centering the dropper. The side of the dropper having the plate 132 is supported by shaft 54 while the flanges 126 at the opposite side rest on the top edge of the back 50 of the cooking tray. When the parts are thus arranged the dropper is in the upright position and centered over the compartment of the cooking tray into which a ring of dough is to be dropped. Operation of the dropper discharges such ring of dough. The dropper is then moved to the next compartment and positioned properly thereover by the reception of the notched end of the plate 132 into the respective groove 144. The dropper is again actuated to deposit a ring of dough into the respective compartment. This is continued until dough rings have been deposited in all of the compartments and since the time required to carry out this part of the operation is very short, the bottom part of the dough is cooked approximately the same length of time. Actually the differences in the cooking of the dough first deposited and that last deposited is not enough to be of consequence.

It is possible to deposit all of the dough rings into the compartments of the cooking tray at one time. This is effected by placing the dough rings on any suitable tray (not shown), and then flipping the tray over so that the dough rings drop simultaneously into respective compartments of the cooking tray.

While the lower portions of the rings of dough are being cooked, gas from within the cooking material escapes from the upper uncooked portion and by the time the lower portion is cooked the desired amount, the dough has been gassed out.

The tray 44 is then swung or rotated upwardly and forwardly by means of the handle thereof so as to reach the position shown in dotted lines in FIG. 2. The half cooked doughnuts are then discharged into the respective spaces between the partitions 82 of the cooking rack 74 with the uncooked side down and in the shortening or grease. The cooking tray is then returned to the normal or cooking position shown in FIGS. 1 and 2.

When the lower part of the doughnut has been properly cooked, the cooking rack 74 is rotated or swung upwardly and forwardly a sufficient amount to cause the now fully cooked doughnuts to be deposited into the respective compartments of the icing tray. The cooking rack is then returned to its normal cooking position, shown in FIGS. 1 and 2.

The icing rack is then raised and shifted to the draining position shown in dotted lines in FIG. 2 and when surplus icing has drained back into the compartments of the icing container the icing rack is swung or rotated forwardly to deposit the iced doughnuts onto the perforate top 150 of a receiving tray 145 held in one hand of the operator while actuating the icing rack with the other hand. It will be apparent that the doughnuts are deposited on the icing tray 145 with the uniced side down. The icing rack is then returned to its normal position, shown in solid lines in FIGS. 1 and 2 and the icing tray transferred to a table or the like.

It has been found that even an inexperienced operator can successfully operate the apparatus of the present invention. It has also been found that once one batch of doughnuts has been cooked on one side and transferred to the cooking rack, the operator can start the next batch and stagger the steps of the operation so that at least two batches are being processed through the apparatus simultaneously.

It is thought that the apparatus of the invention and many of the attendant advantages thereof will be understood from the foregoing description and it is thought that it will be apparent that various changes may be made in the form, construction, arrangement of parts without departing from the spirit and scope thereof or sacrificing all of the material advantages thereof, the embodiment of the apparatus and method hereinbefore described being merely by way of example.

I claim:

In a comestible cooking apparatus, a support structure including a pair of laterally-spaced, vertically-arranged side support side walls, an imperforate, open-topped comestible cooking liquid container disposed between and supported by said side support side walls, a pair of perforate comestible suporting members disposed and pivotally mounted within the container for successively supporting the comestibles during the cooking thereof, and a third perforate comestible support member pivotally mounted between the said side walls and closely adjacent the liquid container, manually operable means to pivot one of said pair of comestible supports within the container upwardly and through between 90° and about 180° to a comestible gravity discharge position above the level of the cooking liquid and substantially overlying the second of said pair of comestible supports, manually operable means to pivot the said second comestible support upwardly above the level of the cooking liquid and through between 90° and about 180° to a comestible discharge position outside the container and substantially overlying the third comestible support, manually operable means to pivot said third comestible support, upwardly and through between 90° and about 180° to a position at which the comestibles thereon will be gravity discharged therefrom, a second imperforate container on which the third comestible support is mounted for pivotal movement into and out therefrom, and a transversely extending, longitudinally shiftable shaft on which the third comestible support is mounted to releasably support said third comestible support above the top of said second imperforate container and in overlying relation thereto.

References Cited in the file of this patent
UNITED STATES PATENTS

| | | |
|---|---|---|
| 759,618 | Korbel | May 10, 1904 |
| 1,391,212 | Schaller | Sept. 20, 1921 |
| 1,580,684 | Scheidigger | Apr. 13, 1926 |
| 1,741,722 | Kremmling | Dec. 31, 1929 |
| 2,026,203 | Ackles | Dec. 31, 1935 |
| 2,067,849 | Hunter | Jan. 12, 1937 |
| 2,092,160 | Hawerlander | Sept. 7, 1937 |
| 2,614,485 | Sinkwitz et al. | Oct. 21, 1952 |
| 2,615,811 | Block et al. | Oct. 28, 1952 |
| 2,931,289 | Ackles | Apr. 5, 1960 |